United States Patent
Schillinger et al.

(10) Patent No.: US 10,401,196 B2
(45) Date of Patent: Sep. 3, 2019

(54) METHOD FOR PRODUCING A COIL AS MEASURING PICKUP FOR A SENSOR

(71) Applicant: Continental Teves AG & Co. oHG, Frankfurt (DE)

(72) Inventors: Jakob Schillinger, Gaimersheim (DE); Dietmar Huber, Rödermark (DE); Frank Grunwald, Oberursel (DE); Hilmar Müller, Heuchelheim (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 491 days.

(21) Appl. No.: 14/652,851

(22) PCT Filed: Dec. 17, 2013

(86) PCT No.: PCT/EP2013/076930
§ 371 (c)(1),
(2) Date: Jun. 17, 2015

(87) PCT Pub. No.: WO2014/095884
PCT Pub. Date: Jun. 26, 2014

(65) Prior Publication Data
US 2015/0332851 A1    Nov. 19, 2015

(30) Foreign Application Priority Data
Dec. 20, 2012 (DE) .................. 10 2012 224 101

(51) Int. Cl.
*H01F 27/28* (2006.01)
*G01D 5/20* (2006.01)
(Continued)

(52) U.S. Cl.
CPC ............ *G01D 5/204* (2013.01); *H01F 5/02* (2013.01); *H01F 17/045* (2013.01);
(Continued)

(58) Field of Classification Search
CPC ....... H01F 37/00; H01F 27/022; H01F 27/306
See application file for complete search history.

(56) References Cited

U.S. PATENT DOCUMENTS 5,883,511 A * 3/1999 Foster ............... G01P 1/026
324/174
6,534,888 B1 * 3/2003 Vorberg ............. H02K 5/00
310/67 R
(Continued)

FOREIGN PATENT DOCUMENTS

DE      10130572       1/2003
DE      10139839   *   3/2003   ....... B29C 45/14639
(Continued)

OTHER PUBLICATIONS

German Search Report for German Application No. 10 2012 224 101.9 dated Mar. 12, 2013, including partial translation.
(Continued)

*Primary Examiner* — Alesa Allgood
(74) *Attorney, Agent, or Firm* — RatnerPrestia (57) ABSTRACT

A method for producing a coil as a measurement transmitter for a sensor, including: providing electrical connections and a magnetic core for the coil, forming a coil former around the magnetic core in such a way that the magnetic core is at least partially enclosed by the coil former and the electrical connections are held by the coil former, winding at least one coil wire onto the formed coil former, and connecting the wound coil wire to the electrical connections.

10 Claims, 6 Drawing Sheets

(51) Int. Cl.
*H01F 5/02* (2006.01)
*H01F 17/04* (2006.01)
*H01F 27/30* (2006.01)
*H01F 41/064* (2016.01)
*H01F 41/098* (2016.01)
*H01F 5/04* (2006.01)

(52) U.S. Cl.
CPC ......... *H01F 27/306* (2013.01); *H01F 41/064* (2016.01); *H01F 41/098* (2016.01); *H01F 2005/043* (2013.01); *Y10T 29/49073* (2015.01)

(56) References Cited

U.S. PATENT DOCUMENTS

| | | | | |
|---|---|---|---|---|
| 6,562,884 | B1 * | 5/2003 | Tang | C08G 59/5093 523/443 |
| 6,836,128 | B2 | 12/2004 | Palata | |
| 7,786,832 | B2 | 8/2010 | Lin | |
| 2003/0156002 | A1 * | 8/2003 | Caramela | H01F 27/292 336/200 |
| 2008/0169894 | A1 * | 7/2008 | Proehl | G01D 5/2013 336/65 |
| 2009/0115559 | A1 * | 5/2009 | Feist | H01F 5/02 336/105 |
| 2010/0156580 | A1 * | 6/2010 | Bill | A62C 3/16 335/219 |
| 2011/0006870 | A1 * | 1/2011 | Sakamoto | H01F 1/26 336/221 |
| 2012/0212313 | A1 * | 8/2012 | Burrows | F02P 9/007 336/90 |
| 2012/0326831 | A1 * | 12/2012 | Suzuki | H01F 27/263 336/233 |

FOREIGN PATENT DOCUMENTS

| | | |
|---|---|---|
| EP | 0893699 | 1/1999 |
| EP | 1806756 | 7/2007 |
| JP | 07161563 | 6/1995 |

OTHER PUBLICATIONS

International Search Report for International Application No. PCT/EP2013/076930 dated Apr. 8, 2014.
Chinese Office Action dated Jul. 20, 2016 for Chinese Application No. 201380073358.0, including translation, 14 pages.

* cited by examiner

Fig. 8

METHOD FOR PRODUCING A COIL AS MEASURING PICKUP FOR A SENSOR

CROSS REFERENCE TO RELATED APPLICATIONS

This application is the U.S. National Phase Application of PCT/EP2013/076930, filed Dec. 17, 2013, which claims priority to German Patent Application No. 10 2012 224 101.9, filed Dec. 20, 2012, the contents of such applications being incorporated by reference herein.

FIELD OF THE INVENTION

The invention relates to a method for producing a measuring pickup and to the measuring pickup.

BACKGROUND OF THE INVENTION

DE 101 30 572 A1, which is incorporated by reference, discloses an inductive measuring pickup for a position sensor, which measuring pickup outputs an electrical signal to an evaluation circuit on the basis of a magnetic field of an encoder element, which magnetic field is dependent on the position of the encoder element.

SUMMARY OF THE INVENTION

An aspect of the invention aims to improve the known inductive measuring pickup.

In accordance with one aspect of the invention, a method for producing a coil as measuring pickup for a sensor comprises the steps of arranging electrical connections and a magnetic core for the coil, forming a coil former around the magnetic core in such a way that the magnetic core is at least partially enveloped by the coil former and the electrical connections are held by the coil former, winding at least one coil wire onto the coil former formed, and connecting the wound coil wire to the electrical connections.

The specified method is based on the consideration that the coil former of the measuring pickup could be manufactured in advance, for example, by injection molding, wherein the magnetic core could then be held in the prefabricated coil former by means of adhesive bonding, for example.

However, the specified method is based on the knowledge that this production procedure would be very involved since at least the adhesive-bonding step of the magnetic core on the coil former would need to be implemented using technically complex means in this case.

In contrast, the specified method is based on the concept of manufacturing the coil former in such a way that the magnetic core is held in the coil core by a form-fitting connection. For this purpose, the magnetic core is at least partially enveloped by the coil former, with the result that it can no longer fall out of the coil former owing to the form-fitting connection thus formed.

In this way, it is possible to dispense with the abovementioned adhesive-bonding step in the production of the measuring pickup.

In a development of the specified method, the coil former is formed by means of a transfer molding process.

In a particular development, the coil former comprises a thermosetting plastic material, in particular a resin system. In this case, the entire coil former can be formed from the thermosetting plastic material. A thermosetting plastic material has a particularly low coefficient of thermal expansion and barely shrinks after the transfer molding process. In this way, not only is it possible for a thermal mismatch between the components of the measuring pickup to be avoided, which results in lower levels of thermal stresses in the case of temperature changes in the ambient temperature of the measuring pickup which thus increase the cycling stability of the measuring pickup over the course of this temperature change. The reduced shrinkage of the thermosetting plastic material during curing after the transfer molding process also results in reduced internal mechanical stresses on the magnetic core and in freedom from cleavage between the wound coil wire and the coil former, which represents a relatively low risk of corrosion for the coil wire. In addition, the thermosetting plastic material adheres optimally to the electrical connections and thus results in a particularly tight connection between the electrical connections and the coil former, which in turn reduces the risk of a wire breakage and corrosion.

The thermosetting plastic material can in this case preferably comprise an epoxy resin system, a phenol formaldehyde resin system, a melamine formaldehyde resin system, an unsaturated polyester resin system or another free-flowing resin system or can be formed therefrom. Free-flowing resin systems are in this case delivered in granular form and can be processed in the above-mentioned transfer molding process. In this case, a free-flowing resin system can be delivered via a conventional material supply line as in the case of thermoplastic processing. Furthermore, free-flowing resin systems provide good dimensional stability, a high continuous use temperature, good chemical stability, good mechanical properties, an efficient price-to-performance ratio, and good electrical properties and can be processed using sophisticated machine and process techniques.

Alternatively, however, so-called non-free-flowing resin systems can also be used which include, for example, bulk molding compounds (BMCs), which can be produced on the basis of an unsaturated polyester resin system, for example. Specifically, BMC can be a glass-fiber-reinforced moist polyester. Non-free-flowing resin systems can be delivered in spherical form and have substantially the same positive properties as the free-flowing resin systems.

The magnetic core can be accommodated in the coil former in any desired manner. Thus, the magnetic core can be enclosed in the coil former, for example, during the transfer molding process. The transfer molding process can alternatively also be performed as a premolding process, however, over the course of which a receiving body having a cutout is formed. Then, the magnetic core can be inserted into this cutout, which can be in the form of a depression, for example. Finally, the cutout can be closed with the received magnetic core. The cutout therefore acts as a space in which the magnetic core can be provided. As a result, the material of the magnetic core is protected from high temperature gradients and high peak temperatures of approximately 175° C. during the transfer molding process. In addition, no forces are transferred to the magnetic core in the case of changes in temperature.

Soft-magnetic materials, such as iron-nickel magnets, for example, with and without freedom from magnetostriction, can be selected as magnetic core. Magnetostriction is intended below to mean the change in magnetic characteristic variables such as magnetic field strength, magnetic flux density or magnetic permeability as a result of a mechanical stress such as pressure or tensile strain. Owing to the fact that the magnetic core is inserted into the cutout in a stress-free fashion, the magnetostriction can be avoided.

The material of the magnetic core can be formed in one layer or else in a plurality of layers.

In one development, the specified method can comprise the step of applying a mechanical decoupling material to the magnetic core prior to closing of the cutout, as a result of which the magnetic core is further mechanically decoupled from the coil former so that compressive loads on the magnetic core are largely suppressed. As an alternative or in addition, the cutout can also be filled with an elastic casting material, such as a silicone gel known per se prior to or after insertion of the magnetic core.

The closing of the cutout can be performed using a cover, which can be inserted into the cutout cohesively (by adhesive bonding), in a force-fitting manner (by being clamped) or in a form-fitting manner (by being snapped), for example.

Irrespective of whether the magnetic core is now inserted into a coil former which is produced in advance as part of a premolding process or is encapsulated by casting or injection molding during production of the coil former, the ends of the coil wire can be wound around the electrical connections once they have been wound onto the coil former in order to connect the wound coil wire to the electrical connections. For fastening and at the same time for improved electrical contact-making, the ends of the coil wire can alternatively or additionally be welded, soldered, adhesively bonded or spliced to the electrical connections.

In this case, the electrical connection can be bent in a direction of the coil wire in order to relieve the mechanical load on the coil wire after connection of the wound coil wire to the electrical connection in order that the coil wire is relieved of tension and the winding stress is taken from the coil wire.

In a particular development, the specified method in this case comprises the steps of arranging a deflection pin on the coil former, and connecting the wound coil wire to the electrical connections via the deflection pin. The development is particularly favorable in connection with the bent electrical connection since in this case the relaxation can work better.

In a further alternative development, the specified method comprises the step of forming a housing body around the coil former with the wound coil wire which is connected to the electrical connections. The housing body protects the coil wire and its electrical connection to the electrical connections from mechanical loading and/or the influences of wear such as corrosion.

The material of the housing body can in this case be selected corresponding to the environmental conditions of the measuring pickup to be produced. Particularly preferably, the coil former and the housing body should be formed from a material with an identical coefficient of thermal expansion, in particular from an identical material. In this way, thermal movements of the coil former and the housing body can be matched to one another which results in a further reduction in mechanical stresses.

In a preferred development, the specified method comprises the step of arranging an electrically conductive metal sheet between a contact-making point between the electrical connections and a printed circuit board and the coil former, wherein the housing body is formed around the conductive metal sheet. The electrically conductive metal sheet can be connected, as return metal sheet, mechanically to the coil former or can be inserted into a corresponding transfer molding die directly prior to the transfer molding process in order to produce the housing body, with the result that the electrically conductive metal sheet is embedded between the housing body and the coil former or in the housing body. The return metal sheet in this way defines an additional mechanical reinforcement of the transfer molding parts of the measuring pickup, i.e. the coil former and the housing body, and can notably increase the electromagnetic compatibility of the measuring pickup in an electronic circuit comprising the measuring pickup. In addition, spacings can be preset in a defined manner by the electrically conductive metal sheet.

The electrical connections can be matched to any desired connection technology on the side of the electronics, i.e. at the point at which electrical contact is intended to be made between said electrical connections and a printed circuit board. In this case, pin in paste, surface-mount technology (SMT), pressing-in, welding, splicing or adhesive bonding can be used, for example.

The electrical connections can be connected to one another during production of the measuring pickup in a manner known per se via struts, for example, with the result that the measuring pickup ultimately needs to be disconnected from these struts by punching, for example. Prior to this subsequent separation, however, a bar code or a digital matrix code (DMC) can be applied to the measuring pickup, for example to the housing body, however, via which bar code or digital matrix code the measuring pickup can be identified electronically as regards type, technical data or the like.

In order to simplify the placement of the measuring pickup on a printed circuit board, forming elements can also be applied to the housing body which can be used by a placement tool. If the measuring pickup is used, for example, as a surface mounted device (SMD) known per se, the housing body can be formed with at least one planar surface, on which a suction nozzle of an SMD placement device can act in a manner known per se in order to be able to directly grip the measuring pickup and place it on the printed circuit board.

In accordance with a further aspect of the invention, a measuring pickup is produced using a specified method. In this case, the measuring pickup does not need to have a single coil but can be wound with a plurality of coils, as are used, for example, in a linear position sensor (LIPS).

In accordance with a further aspect of the invention, a sensor comprises a specified measuring pickup and an encoder element, preferably in the form of a magnet, which is arranged movably relative to the measuring pickup.

The specified sensor is particularly preferably a linear position sensor (LIPS).

BRIEF DESCRIPTION OF THE DRAWINGS

The above-described properties, features and advantages of this invention and the way in which they are achieved will become clearer and more easily comprehensible in connection with the description below of the exemplary embodiments, which are explained in more detail in connection with the drawings, in which.

DETAILED DESCRIPTION OF THE INVENTION

The same technical elements are provided with the same reference symbols and only described once in the figures.

Figure 1:
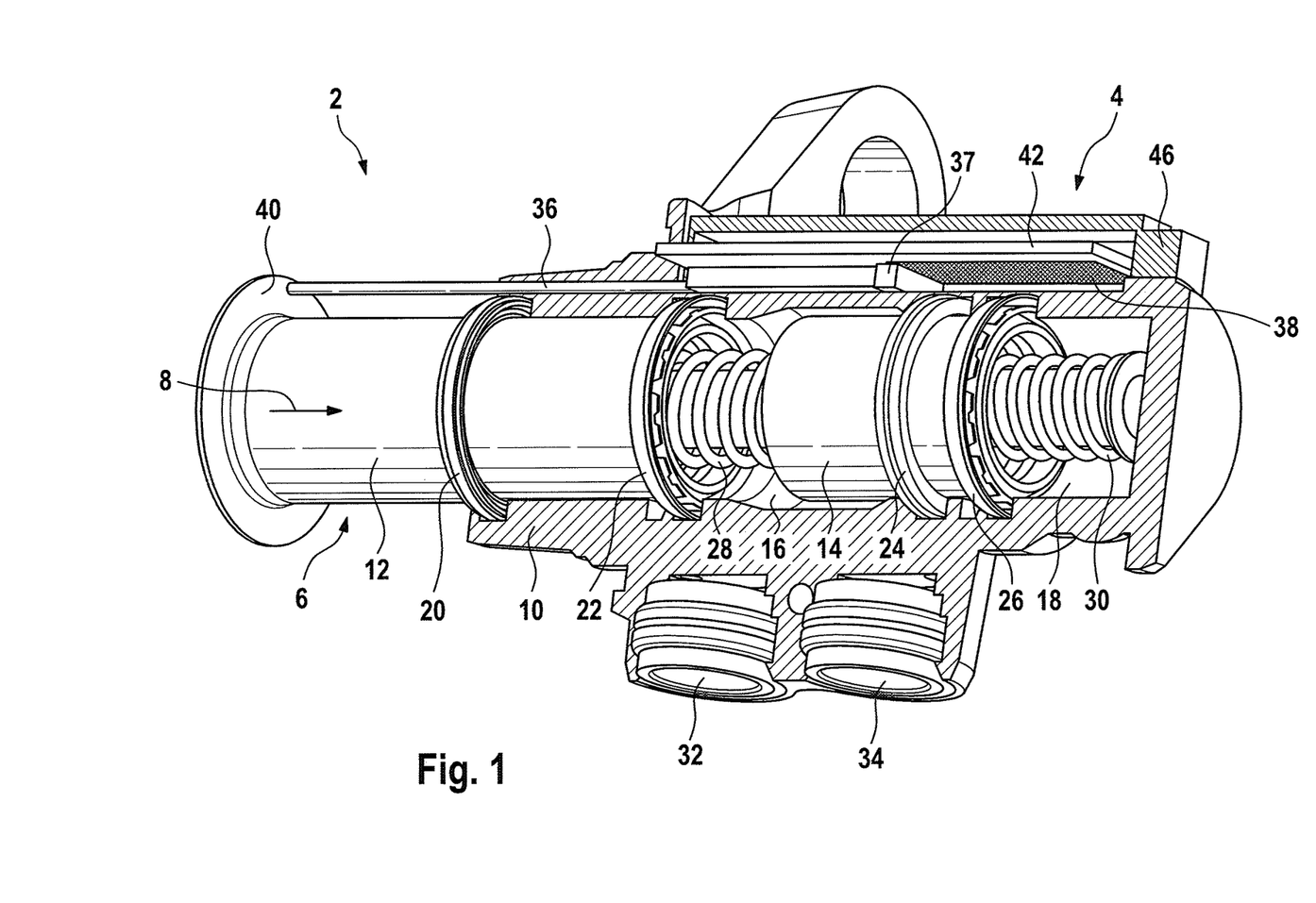
FIG. 1 shows a tandem master cylinder comprising a position sensor.

Reference is made to FIG. 1, which shows a tandem master cylinder 2 comprising a position sensor 4.

The tandem master cylinder 2 also has a pressure piston 6, which is arranged movably in a movement direction 8 in a housing 10, wherein the movement of the pressure piston 6 can be controlled by a foot pedal (not shown). The pressure piston 6 itself is divided into a primary piston 12 and a secondary piston 14, wherein the primary piston 12 closes an inlet of the housing 10 and the secondary piston 12 divides the interior of the housing 10 into a primary chamber 16 and a secondary chamber 18. A secondary collar 20 is arranged in the region of the inlet of the housing 10 on the primary piston 12, which secondary collar insulates the interior of the housing 10 from the ambient air. When viewed into the interior of the housing 10, a primary collar 22 follows the secondary collar 20, said primary collar sealing a gap between the primary piston 12 and a wall of the housing 10. A pressure collar 24 on the secondary piston 14 isolates the pressure of the primary chamber 16 from the pressure of the secondary chamber 18. In addition, a further primary collar 26 on the secondary piston 14 seals a gap between the secondary piston 14 and the wall of the housing 10. The primary piston 12 is supported against the secondary piston 14 via a first spring 28, while the secondary piston is supported against a housing base via a second spring 30. Correspondingly, hydraulic fluid (not shown) can be supplied to the primary chamblber 16 and the secondary chamber 18 via a first and second connection 32, 34.

Since the mode of operation of a tandem master cylinder is known to a person skilled in the art, no detailed description thereof is provided here.

The position sensor 4 has a sampling element in the form of a slide 36 comprising an encoder magnet 37 at its top end, which, when viewed into the plane of the drawing, can be pushed beneath a sensor circuit 38 (yet to be described). In order to push the slide 36, the primary piston 12 has a flange 40, which the slide 36 abuts. The flange 40 and the primary piston 12 therefore together form a measurement object, whose position is determined by the sensor circuit 38 (yet to be described) of the position sensor 4. The sensor circuit 38 is formed from a plurality of conductor tracks on a wiring carrier 42, such as a leadframe, a printed circuit board or another substrate. In order to protect against contamination, for example, a cover 46 can be positioned on the printed circuit board 42 with the sensor circuit 38.

Figure 2:
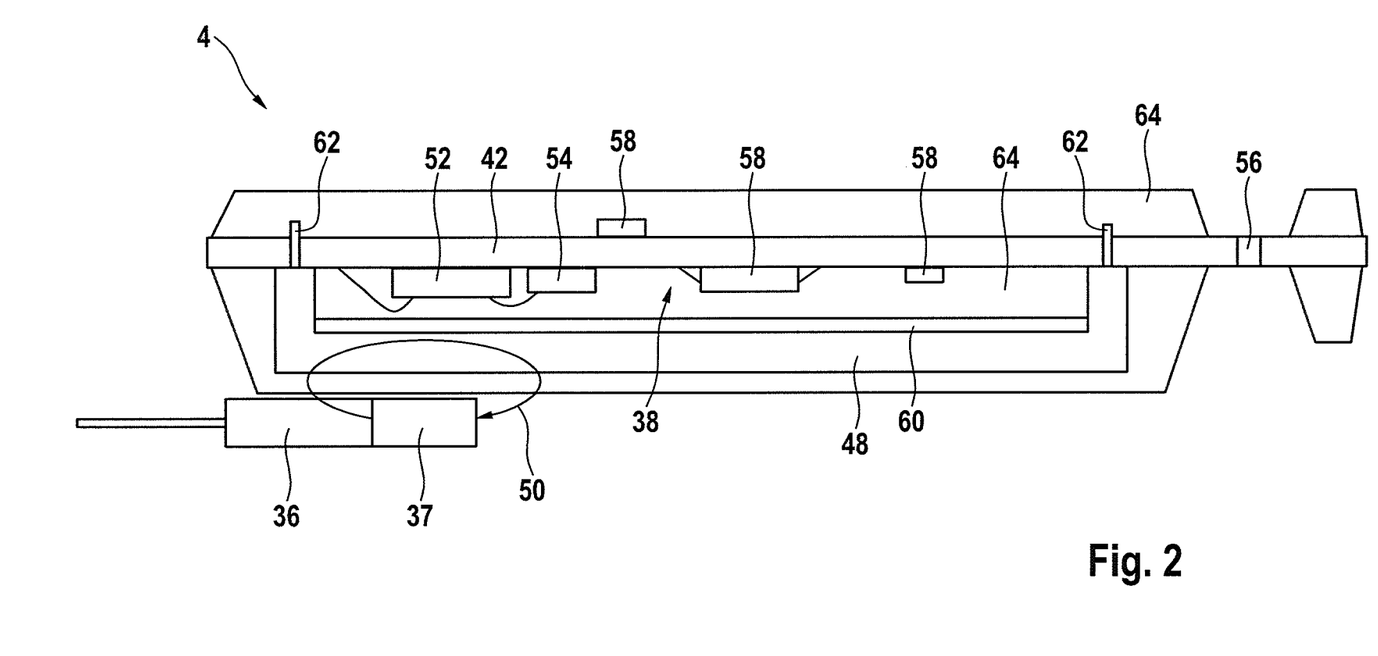
FIG. 2 shows the position sensor from FIG. 1.

Reference is made to FIG. 2, which shows the position sensor 4 shown in FIG. 1.

The circuit 38 of the position sensor comprises a transducer 48, which in the present embodiment is in the form of a linear inductive position sensor (LIPS). The transducer 48 detects a magnetic field 50 of the encoder magnet 37 and outputs an electrical encoder signal (not denoted) to the circuit 38 on the basis of this magnetic field. This encoder signal is converted by a first signal processing chip 52 and a second signal processing chip 54 into a measurement signal (not denoted), from which the position of the slide 36 and therefore the position of the flange 40 and the primary piston 12 is provided. The measurement signal thus produced can finally be tapped off at a transmission interface 56 of the position sensor 4 via a cable (not illustrated) and passed on to a higher signal processing unit (not illustrated) such as, for example, a motor controller in a vehicle (not illustrated).

The circuit 38 can comprise protection elements 58 for protecting the two signal processing chips 52, 54, for example from an overvoltage. In addition, a shielding plate 60 can be arranged between the circuit 38 and the transducer 48, said shielding plate shielding electromagnetic fields between the circuit 38 and the transducer 48 and thus avoiding an influence of the circuit 38 on the transducer 48.

In the present embodiment, the transducer 48 is arranged via a form-fitting connection 62 in a defined position on the wiring carrier 42. In this case, a protective compound 64, which holds the wiring carrier 42 and the transducer 48 mechanically together, the wiring carrier 42 and the transducer 48. In this way, the protective compound 64 can not only ensure a mechanical stability between the wiring carrier 42 and transducer 48, but an interior of the position sensor 4 with the circuit 38 is also effectively protected from contamination. In this case, this interior can particularly preferably likewise be filled with the protective compound 64.

The position sensor 4 can be encapsulated by injection molding, for example, with the protective compound 64 during production. For this purpose, the wiring carrier 42 of the position sensor 4 can be held on the transmission interface 56, for example, which in any case needs to remain free in order to make electrical contact with the abovementioned cable.

Figure 3:
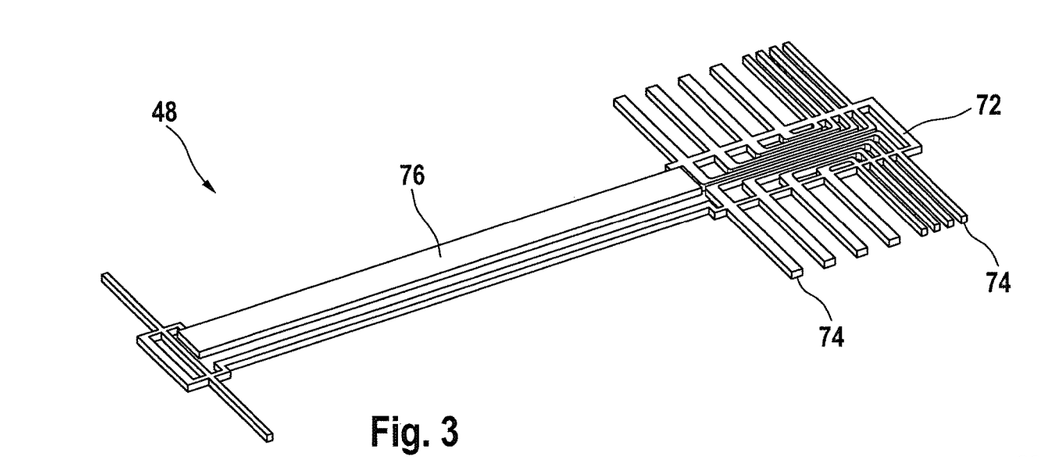
FIG. 3 shows a transducer in the position sensor from FIG. 2 in a first production state.

Reference is made to FIG. 3, which shows the transducer 48 in the position sensor 4 from FIG. 2 in a first production state.

In order to produce the transducer 48, which is to be in the form of an LIPS, a leadframe 72 with contact legs 74 is punched out for the first production state, said leadframe mechanically supporting the transducer 48 on the abovementioned wiring carrier 42 and making electrical contact between said transducer and the circuit 38 on the wiring carrier 42. For reasons of clarity, only some of the contact legs 74 have been provided with a reference symbol in FIG. 3.

Then, a magnetic core 76 is arranged in the leadframe 72, said magnetic core later being provided for transmission of a magnetic field between coils (yet to be described).

Figure 4:
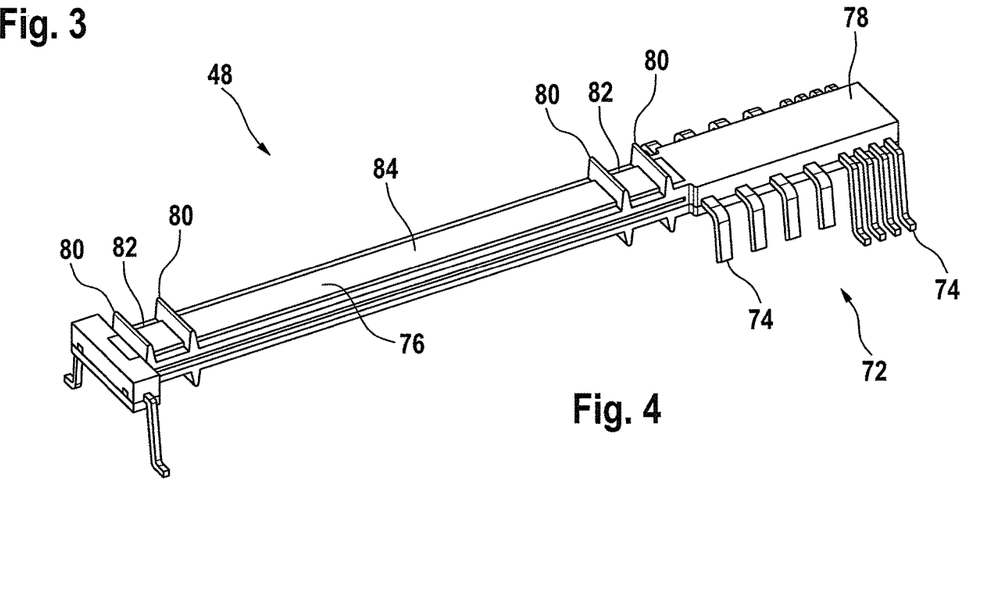
FIG. 4 shows a transducer in the position sensor from FIG. 2 in a second production state.

Reference is made to FIG. 4, which shows the transducer 48 in the position sensor 4 from FIG. 2 in a second production state.

In order to produce the second production state shown in FIG. 4, the leadframe 72 is enveloped with the magnetic core 76 by a transducer protective compound 78. This transducer protective compound 78 in the present embodiment consists of a thermosetting plastic, which has a substantially identical coefficient of thermal expansion to the magnetic core 76, which can be produced from iron-nickel, for example. In the event of temperature fluctuations, hardly any mechanical stresses are thus input into the magnetic core 76.

The transducer protective compound 78 is in this case formed with four separating elements 80 such that they together form a coil former which divides the magnetic core 76 into two outer winding regions 82 and an inner winding region 84. In this case, the outer winding regions 82 are shorter than the inner winding region 84.

Then, if the transducer protective compound 78 has been cured, for example, the contact legs 74 can then be bent in the direction of a lower side of the transducer 48, as shown in FIG. 4.

In order to finish the transducer 48, coil wires (not illustrated) are wound onto the transducer into the winding regions 82, 84. A primary coil is in this case wound beyond all of the winding regions 82, 84, whereas a physically identical secondary coil is wound on into in each case one of the outer winding regions 82.

During operation of the transducer, an electrical AC voltage signal is applied to the primary coil, for example, which AC voltage signal should induce an identical output signal in the physically identical secondary coils via the magnetic core 76.

If the encoder magnet 37 of the slide 36 now approaches one of the two secondary coils, it drives the magnetic core 76 into saturation. This results in a changed transmission behavior of the electrical AC voltage signal between the primary coil and the corresponding secondary coil, to which the encoder magnet 37 has got closer, which can be evaluated via the sensor circuit in a manner known to a person skilled in the art. In this way, the position of the encoder magnet 37 can be detected via the transducer 48.

Figure 5:
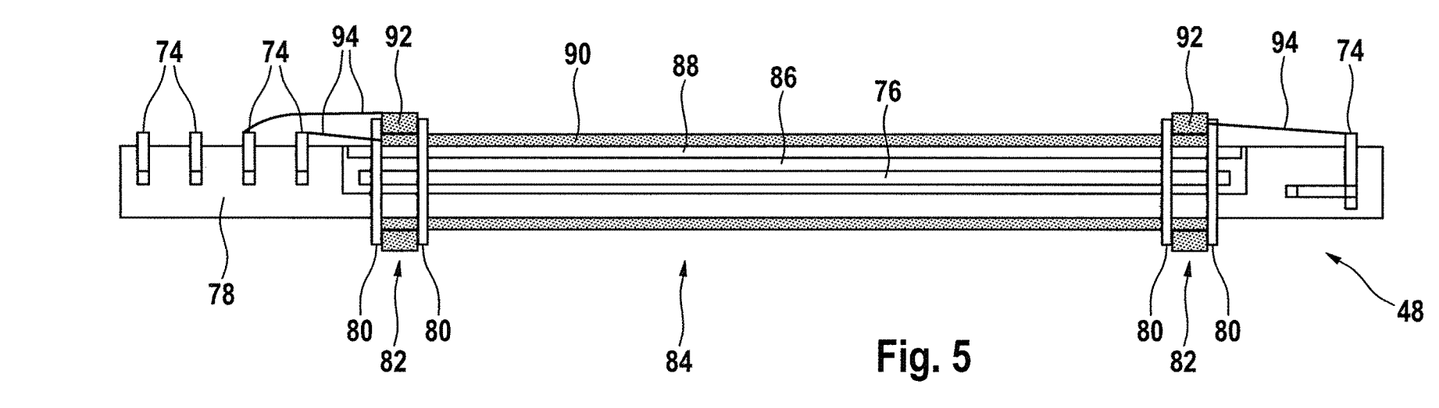
FIG. 5 shows a transducer in the position sensor from FIG. 2 in an alternative second production state.

Reference is made to FIG. 5, which shows the transducer 48 in the position sensor 4 from FIG. 2 in an alternative, second production state in a sectional view.

In order to produce the alternative second production state shown in FIG. 5, first the transducer protective compound 78 is formed as receiving body by means of a transfer molding process, for example, from a thermosetting plastic material with the leadframe 72 and a cutout in the form of a depression 86, into which the magnetic core 76 is inserted. The depression 86 is then closed by a cover 88.

The separating elements 80 shown in FIG. 5 are in this case, in the present embodiment, in the form of dedicated elements, for example, which are pushed out of the transducer protective compound 78 via the receiving body closed by the cover 88.

Then, similarly to FIG. 4, coil wires 90, 92 are wound onto the transducer into the winding regions 82, 84. The primary coil 90 is in this case wound on beyond all of the winding regions 82, 84, while a physically identical secondary coil 92 is wound on into in each case one of the outer winding regions 82.

Figure 6:
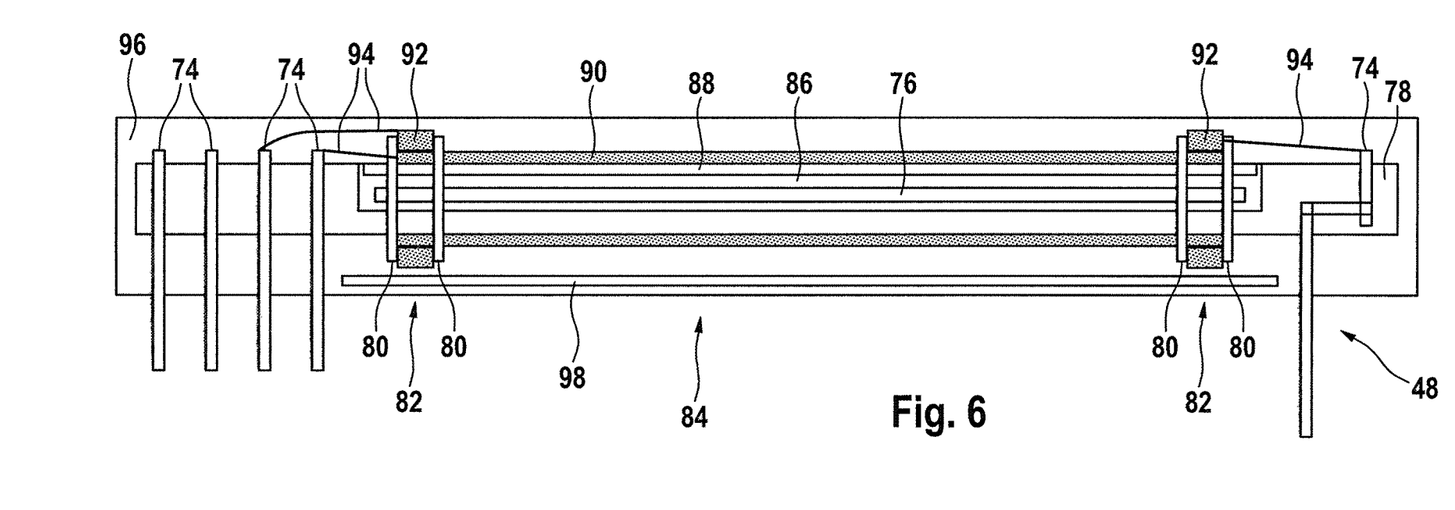
FIG. 6 shows the transducer from FIG. 2 in a final production state.

When the transducer protective compound 78 has been cured, for example, the contact legs 74 of the leadframe 72 can then be bent in the direction of a lower side of the transducer 48, as shown in FIG. 6.

Figure 7:
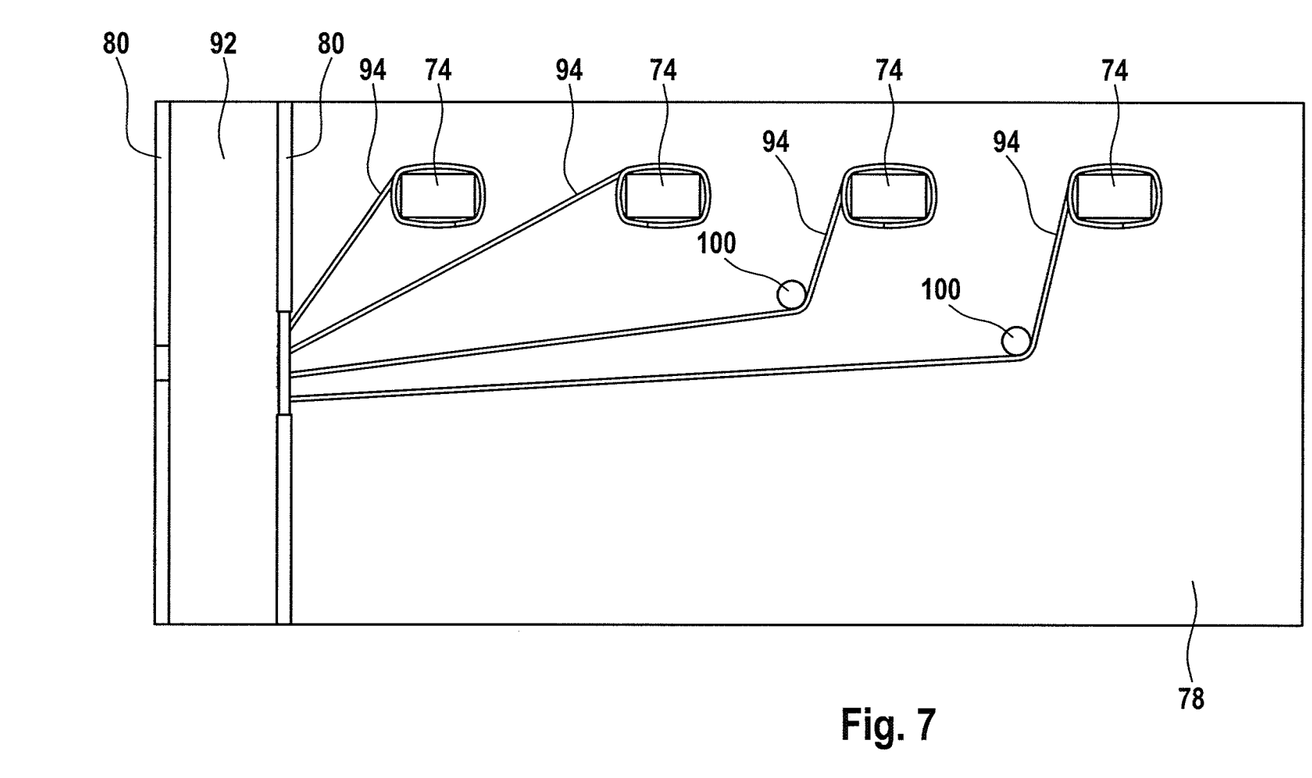
FIG. 7 shows an end region of the transducer in the second production state.
Figure 8:
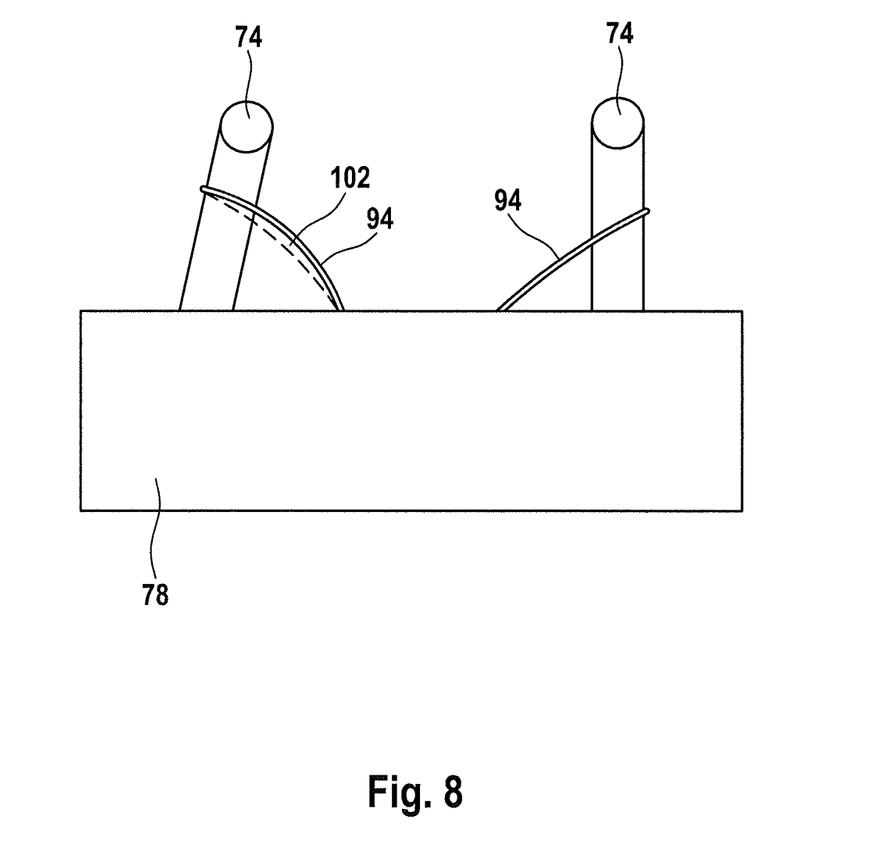
FIG. 8 shows an alternative view of the end region of the transducer in the second production state shown in FIG. 7.

Prior to or after the bending of the contact legs 74, the ends of the wires 94 of the primary coil 90 and the secondary coil 92 can be electrically connected to the contact legs 74, of which more details are given with reference to FIGS. 7 and 8.

The operation of the transducer 48 functions in the same way as the transducer described within the context of FIG. 5.

The transducer 48 in FIG. 3 or in FIG. 5 can finally be accommodated in a housing body 96, which is illustrated by way of example in FIG. 6 on the basis of the transducer 48 shown in FIG. 5. This housing body 96 can enclose the transducer 48 over the entire circumference and thus act as protection from environmental influences.

In order to increase the electromagnetic compatibility of the transducer 48 and in order to increase its mechanical rigidity, an electrically conductive return metal sheet 98 can be cast in the housing body 96.

In order to make electrical contact between the ends of the wires 94 of the primary coil 90 and of the secondary coils 92, the ends of the wires 94 can be wound around the contact legs 74, as shown in FIG. 7, and then electrical contact can be made by means of soldering, for example.

For better physical separation between the individual wires 94, in addition deflection pins 100 can be arranged in the transducer protective compound 78.

In addition, the contact legs 74 can be bent in the direction of the wires 94 after winding of the wires 94 around the contact legs 74, as shown in FIG. 8, as a result of which a mechanical stress-relief region 102 indicated in FIG. 8 is produced, which relieves the tension on the wires 94.

The invention claimed is:

1. A method for producing a coil as measuring pickup for a sensor, comprising:
   arranging electrical connections and a magnetic core for the coil,
   forming a coil former around the magnetic core by forming a receiving body with a cutout, inserting the magnetic core into the cutout, and covering the magnetic core in the cutout with a cover, the coil former formed in such a way that the magnetic core is at least partially enveloped by and held in a fixed position relative to the coil former and the electrical connections are held by the coil former, the coil former including separating elements defining a plurality of separate winding regions,
   winding at least one coil wire onto the formed coil former in one of the plurality of separate winding regions such that at least a portion of the at least one coil wire is wound on the cover, and
   connecting the wound coil wire to the electrical connections.

2. The method as claimed in claim 1, comprising
applying a mechanical decoupling material to the magnetic core) prior to closing of the cutout.

3. The method as claimed in claim 1, comprising:
arranging a deflection pin on the coil former, and
connecting the wound coil wire to one of the electrical connections via the deflection pin.

4. The method as claimed in claim 1, wherein the coil former comprises a thermosetting plastic material.

5. The method as claimed in claim 4, wherein the thermosetting plastic material is a resin system.

6. The method as claimed in claim 1, comprising:
forming a housing body around the coil former with the wound coil wire which is connected to the electrical connections.

7. The method as claimed in claim 6, wherein the coil former and the housing body are formed from a material having an identical coefficient of thermal expansion.

8. The method as claimed in claim 6, comprising:
arranging an electrically conductive metal sheet between a contact-making point between the electrical connections and a printed circuit board and the coil former,
wherein the housing body is formed around the conductive metal sheet.

9. The method as claimed in claim 6, wherein the coil former and the housing body are formed from an identical material.

10. A measuring pickup, which is produced using a method for producing a coil as measuring pickup for a sensor, comprising:
arranging electrical connections and a magnetic core for the coil, forming a coil former around the magnetic core by forming a receiving body, with a cutout, inserting the magnetic core into the cutout, and covering the magnetic core in the cutout with a cover, the coil former formed in such a way that the magnetic core is at least partially enveloped by and held in a fixed position relative to the coil former and the electrical connections are held by the coil former, the coil former including separating elements defining a plurality of separate winding regions, winding at least one coil wire onto the formed coil former in one of the plurality of separate winding regions such that at least a portion of the at least one coil wire is wound on the cover, and connecting the wound coil wire to the electrical connections.

* * * * *